United States Patent
Slottemo et al.

(10) Patent No.: US 11,718,083 B2
(45) Date of Patent: Aug. 8, 2023

(54) METHOD FOR PRODUCING A BUILDING ELEMENT, A PRESSING DEVICE AND A METHOD OF EMBOSSING A WOODEN SURFACE

(71) Applicant: Välinge Innovation AB, Viken (SE)

(72) Inventors: Andreas Slottemo, Helsingborg (SE); Göran Ziegler, Viken (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 17/232,687

(22) Filed: Apr. 16, 2021

(65) Prior Publication Data
US 2021/0323297 A1 Oct. 21, 2021

(30) Foreign Application Priority Data
Apr. 16, 2020 (SE) .................................... 2050435-3

(51) Int. Cl.
*B32B 38/06* (2006.01)
*B32B 37/12* (2006.01)
(Continued)

(52) U.S. Cl.
CPC ................ *B32B 38/06* (2013.01); *B32B 7/12* (2013.01); *B32B 21/042* (2013.01); *B32B 21/08* (2013.01);
(Continued)

(58) Field of Classification Search
CPC ......... B32B 38/06; B32B 7/12; B32B 21/042; B32B 21/08; B32B 21/14; B32B 37/12;
(Continued)

(56) References Cited

U.S. PATENT DOCUMENTS 379,301 A * 3/1888 Wittkowsky ............... B31F 1/07
3,106,500 A * 10/1963 Turner .......................... 156/91
(Continued)

FOREIGN PATENT DOCUMENTS

JP H02-198801 A 8/1990
JP 10 34611 * 2/1998
(Continued)

OTHER PUBLICATIONS

English machine translation of JP 10 34611; Feb. 1998; 10 pages. (Year: 1998).*
(Continued)

*Primary Examiner* — Linda L Gray
(74) *Attorney, Agent, or Firm* — Boone IP Law, PLLC

(57) ABSTRACT

A method for producing a building element, including providing a substrate, applying a thermosetting binder on the substrate or on a wood veneer layer, arranging the wood veneer layer on the substrate with the thermosetting binder intermediate the substrate and the wood veneer layer, arranging an elastic or formable sheet including a polymeric material between the wood veneer layer and a press surface of a pressing device, applying heat and pressure by the pressing device on the elastic or formable sheet, the wood veneer layer, the thermosetting binder, and the substrate, thereby forming a building element including the substrate and the wood veneer layer attached to the substrate by the thermosetting binder, after applying heat and pressure, removing the elastic or formable sheet from the wood veneer layer. Also, a pressing device for embossing a wooden surface and a method of embossing a wooden surface.

31 Claims, 2 Drawing Sheets

(51) Int. Cl.
  *B32B 7/12* (2006.01)
  *B32B 21/04* (2006.01)
  *B32B 21/08* (2006.01)
  *B32B 21/14* (2006.01)

(52) U.S. Cl.
  CPC .............. *B32B 21/14* (2013.01); *B32B 37/12* (2013.01); *B32B 2419/00* (2013.01)

(58) Field of Classification Search
  CPC ..... B32B 2419/00; B29C 59/00; B29C 35/02; B29C 37/0025; B29C 59/02; B31F 1/07; B29K 2083/00
  See application file for complete search history.

(56) References Cited

U.S. PATENT DOCUMENTS

| | | |
|---|---|---|
| 4,093,766 A | 6/1978 | Scher et al. |
| 4,376,812 A | 3/1983 | West |
| 5,203,941 A | 4/1993 | Spain et al. |
| 6,210,512 B1 * | 4/2001 | Jones .................... B44C 5/0415 156/212 |
| 7,811,489 B2 | 10/2010 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,567,469 B2 * | 10/2013 | Meyer .................... 156/583.3 |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 11,313,123 B2 | 4/2022 | Pervan et al. |
| 11,318,726 B2 | 5/2022 | Pervan et al. |
| 2009/0145066 A1 | 6/2009 | Pervan |
| 2009/0155612 A1 | 6/2009 | Pervan et al. |
| 2010/0092731 A1 | 4/2010 | Pervan et al. |
| 2010/0291397 A1 | 11/2010 | Pervan et al. |
| 2010/0300030 A1 | 12/2010 | Pervan et al. |
| 2010/0323187 A1 | 12/2010 | Kalwa |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0293906 A1 | 12/2011 | Jacobsson |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0308774 A1 | 12/2012 | Persson et al. |
| 2013/0092314 A1 | 4/2013 | Zeigler et al. |
| 2013/0095315 A1 | 4/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0018661 A1 | 7/2014 | Pervan |
| 2014/0199558 A1 | 7/2014 | Pervan et al. |
| 2014/0234531 A1 | 8/2014 | Ziegler et al. |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Håkansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |

(56) References Cited

U.S. PATENT DOCUMENTS

| | | |
|---|---|---|
| 2021/0078305 A1 | 3/2021 | Schulte |
| 2021/0101310 A1 | 4/2021 | Lindgren et al. |
| 2021/0197534 A1 | 7/2021 | Ziegler et al. |
| 2021/0277670 A1 | 9/2021 | Ziegler et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |
| 2022/0063326 A1 | 3/2022 | Persson et al. |
| 2022/0176582 A1 | 6/2022 | Nilsson |

FOREIGN PATENT DOCUMENTS

| | | | |
|---|---|---|---|
| JP | 3113968 | * | 9/2000 |
| JP | 5574578 B2 | * | 7/2014 |
| KR | 2009-0048951 A | | 5/2009 |
| WO | WO 2009/124704 A1 | | 10/2009 |
| WO | WO 2015/105455 A1 | | 7/2015 |
| WO | WO 2015/105456 A1 | | 7/2015 |

OTHER PUBLICATIONS

English machine translation JP 2 198801; Aug. 1990; 2 pages (Year: 1990).*

Ziegler, Göran, et al., U.S. Appl. No. 17/697,417 entitled "Method to Produce a Building Panel and a Building Panel," filed in the U.S. Patent and Trademark Office filed Mar. 17, 2022.

Pervan, Darko, et al., U.S. Appl. No. 17/711,487 entitled "Wood Fibre Based Panel with a Surface Layer," filed in the U.S. Patent and Trademark Office filed Apr. 1, 2022.

Rittinge, Rickard, et al., U.S. Appl. No. 17/769,594 entitled "Wood Fibre Based Panel and a Method for Obtaining Such Panel," filed in the U.S. Patent and Trademark Office filed Apr. 15, 2022.

Ziegler, Göran, et al., U.S. Appl. No. 17/747,325 entitled "Method of Producing a Veneered Element," filed in the U.S. Patent and Trademark Office filed May 18, 2022.

U.S. Appl. No. 17/769,436, Hans Persson, Darko Pervan and Magnus Nilsson, filed Apr. 15, 2022.

U.S. Appl. No. 17/769,530, Hans Persson, Darko Pervan and Magnus Nilsson, filed Apr. 15, 2022.

U.S. Appl. No. 17/768,730, Hans Persson, Darko Pervan and Magnus Nilsson, filed Apr. 15, 2022.

Persson, Hans, et al., U.S. Appl. No. 17/769,436 entitled "Methods and Arrangements for Continuous Manufacture of Building Panels", filed in the U.S. Patent and Trademark Office filed Apr. 15, 2022.

Persson Hans, et al., U.S. Appl. No. 17/769,530 entitled "Methods and Arrangements for Continuous Manufacture of Building Panels", filed in the U.S. Patent and Trademark Office filed Apr. 15, 2022.

Persson Hans, et al., U.S. Appl. No. 17/768,730 entitled "Methods and Arrangements for Continuous Manufacture of Building Panels", filed in the U.S. Patent and Trademark Office filed Apr. 15, 2022.

U.S. Appl. No. 15/183,424, Darko Pervan, filed Jun. 15, 2016, (Cited herein as US Patent Application Publication No. 2016/0369507 A1 of Dec. 22, 2016).

U.S. Appl. No. 16/132,977, Darko Pervan, filed Sep. 17, 2018, (Cited herein as US Patent Application Publication No. 2019/0010711 A1 of Jan. 10, 2019).

U.S. Appl. No. 16/365,764, Christer Lundblad, filed Mar. 27, 2019, (Cited herein as US Patent Application Publication No. 2020/0055287 A1 of Feb. 20, 2020).

U.S. Appl. No. 16/738,334, Anette Hedlund, filed Jan. 9, 2020, (Cited herein as US Patent Application Publication No. 2020/0215799 A1 of Jul. 9, 2020).

U.S. Appl. No. 17/038,567, Marcus Bergelin, filed Sep. 30, 2020, (Cited herein as US Patent Application Publication No. 2021/0008863 A1 of Jan. 14, 2021).

U.S. Appl. No. 17/090,511, Guido Schulte, filed Nov. 5, 2020, (Cited herein as US Patent Application Publication No. 2021/0078305 A1 of Mar. 18, 2021).

U.S. Appl. No. 17/202,836, Göran Ziegler, filed Mar. 16, 2021, (Cited herein as US Patent Application Publication No. 2021/0197534 A1 of Jul. 1, 2021).

U.S. Appl. No. 17/205,469, Göran Ziegler, filed Mar. 18, 2021, (Cited herein as US Patent Application Publication No. 2021/0277670 A1 of Sep. 9, 2021).

U.S. Appl. No. 17/352,942, Guido Schulte, filed Jun. 21, 2021, (Cited herein as US Patent Application Publication No. 2022/0024195 A1 of Jan. 27, 2022).

U.S. Appl. No. 17/496,441, Göran Ziegler, filed Oct. 7, 2021, (Cited herein as US Patent Application Publication No. 2022/0024189 A1 of Jan. 27, 2022).

U.S. Appl. No. 17/543,962, Magnus Nilsson, filed Dec. 7, 2021.

International Search Report/Written Opinion dated May 4, 2021 in PCT/SE2021/050353, Patent-och registreringsverket, Stockholm, SE, 14 pages.

Nilsson, Magnus, et al., U.S. Appl. No. 17/543,962 entitled "Method to Produce a Veneered Element and a Veneered Element," filed in the U.S. Patent and Trademark Office filed Dec. 7, 2021.

* cited by examiner

METHOD FOR PRODUCING A BUILDING ELEMENT, A PRESSING DEVICE AND A METHOD OF EMBOSSING A WOODEN SURFACE

CROSS REFERENCE TO RELATED APPLICATIONS

The present application claims the benefit of Swedish Application No. 2050435-3, filed on Apr. 16, 2020. The entire contents of Swedish Application No. 2050435-3 are hereby incorporated herein by reference in their entirety.

TECHNICAL FIELD

Embodiments of the present invention relates to a method for producing a building element, a pressing device, and a method of embossing a wooden surface.

TECHNICAL BACKGROUND

The surface of wood veneers and wood panels has a natural embossing, for example formed by grains, knots, growth rings, etc. However, when pressing a wooden surface, the natural structure of the wooden surface is often compressed such that after pressing, the natural structure is reduced. The visual impression of the wooden surface may be that the surface is even without any structure. The visual impression may thereby be less vivid and less appealing.

When producing building panels, a wooden surface such as a wood veneer layer or solid wood layer is adhered to a board, and pressure is often used for adhering the wooden surface to the board.

Building panels, such as floor panels, may be of a type comprising a wood veneer attached to a board by a sub-layer comprising among other a binder. Such a building panel is described in WO2015/105455 and WO2015/105456. It has been discovered that when pressing a wood veneer layer with a sub-layer comprising a thermosetting binder to a board, no or substantially no spring back of compressed portions after pressing takes place. The thermosetting binder of the sub-layer permeates the wood veneer and when cured, locks the wood veneer in the compressed state. Consequently, the surface of the wood veneer layer is smoothened such that no deep embossing is present. The surface of the wood veneer layer is substantially flat and the natural embossed structure of the wood veneer layer is reduced compared to prior to pressing.

Another problem which may arise when pressing a wooden surface is that the pressure from the press plate is not uniformly distributed over the surface. For example, at an embossed portion the pressure is lower compared to the pressure at a protruding portion. If a thermosetting binder is used for adhering the wooden surface to a board or to impregnate the wooden surface, the thermosetting binder may not be fully cured at such lower portions of the wooden surface due to the lower pressure. A similar problem arises if the underlying board is provided with an embossed portion in form of a groove, which the wooden surface is to follow.

A conventional method to provide a surface with an embossed structure is to press the surface with an embossed press plate. However, in order to form an aesthetically attractive surface, the embossing should preferably be in register with the design of the building panel. For laminates, this is achieved by using the printed design when creating the pattern of the embossed press plate, such that an embossing in register with the print is obtained. For a natural surface as a wooden surface, it is not possible to manufacture a press plate for each surface in order to form an in-register embossing. Consequently, a wooden surface pressed with an embossed press plate will obtain an embossing not being in-register with the natural pattern.

SUMMARY

It is an object of at least embodiments of the present invention to provide an improvement over the above described techniques and art.

A further object of at least embodiments of the present invention is to provide an improved method of pressing a wooden surface.

A further object of at least embodiments of the present invention is to provide a wooden surface with an embossed structure.

A further object of at least embodiments of the present invention is to increase a natural embossed structure of a wooden surface.

A further object of at least embodiments of the present invention is to provide a pressing device for embossing a wooden surface.

A further object of at least embodiments of the present invention is to provide a building element comprising a wood veneer layer having an embossed structure.

At least some of these and other objects and advantages that will be apparent from the description have been achieved by a method for producing a building element according to a first aspect. The method comprises
  providing a substrate,
  applying a thermosetting binder on the substrate or on a wood veneer layer,
  arranging the wood veneer layer on the substrate with the thermosetting binder intermediate the substrate and the wood veneer layer,
  arranging an elastic sheet comprising a polymeric material between the wood veneer layer and a press surface of a pressing device,
  applying heat and pressure by the pressing device on the elastic sheet, the wood veneer layer, the thermosetting binder, and the substrate, thereby forming a building element comprising the substrate and the wood veneer layer attached to the substrate by the thermosetting binder,
  after applying heat and pressure, removing the elastic sheet from the wood veneer layer.

An advantage of at least embodiments of the first aspect is that the natural embossing of the wood veneer layer is retained and sometimes even increased during pressing. Thereby, the wood veneer layer will have its natural embossing or even have a deeper embossing after pressing. When pressing in a conventional manner with a non-structured press plate, the wood veneer layer is compressed and the natural structure of the wood veneer is reduced due to compressing of the wood veneer layer.

During pressing, elastic properties of the elastic sheet allow the elastic sheet to follow the structure of the wood veneer layer and transfers the pressure from the pressing device to each part of the wood veneer layer. The elastic sheet distributes the pressure applied substantially uniformly over the surface of the wood veneer layer. Thereby, a desirable substantially uniform pressure is applied to the wood veneer layer over its surface. The pressure applied to protruding parts of the wood veneer layer and naturally embossed portions of the wood veneer layer is substantially the same. In an embodiment the applied pressure between the protruding parts of the wood veneer surface and naturally embossed portions is within 10% of each other.

The elastic sheet is pressed to follow the structure of the wooden surface. Pressure is applied into embossed portions of the wood veneer layer by the elastic sheet.

The elastic sheet preferably has properties enabling it to spring back to its original form after pressing. This is advantageous since the elastic sheet then may be reused.

Especially when a thermosetting binder is used to adhere the wood veneer layer to the substrate, distributing the pressure uniformly over the wood veneer layer surface is important to ensure that the thermosetting binder is cured at all parts. If the pressure is not uniformly distributed, there is a risk that the thermosetting binder is not completely cured at portions wherein the pressure applied is low.

If the substrate is provided with a groove, later intended to form e.g. a bevel, the elastic sheet provides similar advantages as described above. The elastic sheet allows the pressure to be distributed to the groove surface, with similar advantages as described above.

In the following, the term embossing or embossed portions is used to also include any groove.

A substantially uniformly distributed pressure is also of importance if a protective layer is applied on the wood veneer layer. Such a protective layer is applied intermediate the wood veneer layer and the elastic sheet. A uniformly distributed pressure allows the protective layer to press into embossed portions of the wood veneer layer. Thereby, improved attachment of the protective layer to the wood veneer layer is obtained.

If the protective layer comprises a thermosetting binder, a uniform pressure distributed by the elastic sheet improves uniform curing of the thermosetting binder. If the wood veneer layer comprises embossed portions, for example formed of a knot hole, crack and/or groove or bevel, there is a risk that the thermosetting binder is not completely cured at such portions. In the final product, this may be visible as such portions being hazy or white coloured. By improving distribution of the pressure applied by the elastic sheet, uniform pressure is applied to such embossed portions and curing of the thermosetting binder is improved. Thereby, occurrence of portions being hazy or white coloured is a least reduced.

The press surface of the pressing device may be non-structured. The elastic sheet allows the natural embossed structure to be retained even if the press surface is non-structured.

The press surface of the pressing device may be substantially planar.

The elastic sheet may have a shore value of less than 60 D. It has been shown that a shore value less than 60 D is sufficient elastic to distribute the applied pressure substantially uniformly over and into the structure of the wood veneer layer. The shore value is measured according to ISO 868:2003.

The elastic sheet may have a shore value in the range of 30 A to 60 D. It has been shown that a shore value between 30 A to 60 D provides desired elastic properties to distribute the applied pressure substantially uniformly over and into the structure of the wood veneer layer. The shore value is measured according to ISO 868:2003.

If measuring the shore value in the A scale only, the elastic sheet may have a shore value in the range of 30 A to 98 A. The shore value is measured according to ISO 868:2003.

The polymeric material of the elastic sheet may be an elastomeric material. The elastomeric material may be natural or synthetic rubber.

The elastomeric material may be silicone rubber. The elastomeric material may be styrene-butadiene rubber. The elastomeric material may be fluoroelastomer.

The elastomeric material may be selected from synthetic polyisoprene, chloroprene rubber, butyl rubber, styrene-butadiene rubber (SBR), nitrile rubber, ethylene propylene rubber, polyacrylic rubber, silicone rubber, fluorosilicone rubber, fluoroelastomers, ethylene-vinyl acetate (EVA), elastomeric polyurethane. The elastomeric material may be a rubber blend such as EVA/SBR.

For example, a suitable shore value, as measured according to ISO 868:2003, of chloroprene rubber may be 40-95 A. A suitable shore value, as measured according to ISO 868:2003, of styrene-butadiene rubber (SBR), may be 60-70 A. A suitable shore value, as measured according to ISO 868:2003, of ethylene-vinyl acetate (EVA), may be 30-40 A.

A thickness of the elastic sheet may be less than 2 mm. The thickness of the elastic sheet defines the maximum depth of an embossed portion of the wood veneer layer. However, the thicker sheet, heat transferring properties of the elastic sheet may be reduced.

A thickness of the elastic sheet may be between 0.2 to 1.5 mm, preferably between 0.4 to 1.2 mm.

During applying heat and pressure, the elastic sheet may be pressed into a structure in the wood veneer layer. The elastic sheet may follow a structure in the surface of the wood veneer layer.

The structure may be an embossing such as a natural embossing of the wood veneer, or a groove or bevel.

A depth of an embossed portion of the wood veneer layer after applying heat and pressure may exceed a depth of the embossed portion of the wood veneer layer prior to applying heat and pressure. The depth is measured at the same embossed portion. The elastic sheet allows embossed portions to be further embossed by distributing the pressure substantially uniformly over the structured surface of the wood veneer layer and into the embossed portion. This surprising effect is especially noticeable if the wood veneer layer is of a type of wood having softer portions or portions of lower density, in relation to other types of wood, within the veneer layer. The deeper embossing may be achieved in such softer portions or portions of lower density during pressing. During pressing as the elastic sheet is compressed increasing the hardness of the elastic sheet. Simultaneously during pressing, the hardness of the wood veneer layer with its softer portions is decreased. When, during pressing, the hardness of the compressed elastic sheet exceeds the hardness of such a softer portion in the wood veneer layer, the natural embossing in that portion may be increased.

The pressure applied from the pressing device may be uniformly applied to the wood veneer layer by means of the elastic sheet.

The pressure applied may be 20-80 bar, preferably 40-60 bar.

The temperature applied may be 120-240° C., preferably 160-220° C.

Heat and pressure may be applied for 20-60 seconds, preferably for 30-45 seconds.

Heat and pressure applied may be adapted to the thermosetting binder used. Heat and pressure applied may be adapted to a curing temperature of the thermosetting binder.

The substrate may be a wood based board. The building element may thereby be a building panel such as a floor panel, wall panel or furniture component.

The substrate may be a wood veneer layer. A building element may thereby be formed. The building element may in a subsequent step be applied to a board, for example a wood-based board, thereby forming a building panel such as a floor panel, wall panel or furniture component.

According to a second aspect, a method for producing a building element is disclosed. The method comprises providing a substrate, applying a thermosetting binder on the substrate or on a wood veneer layer, arranging the wood veneer layer on the substrate with the thermosetting binder intermediate the substrate and the wood veneer layer, arranging a formable sheet comprising a thermoplastic material between the wood veneer layer and a press surface of a pressing device, applying heat and pressure by the pressing device on the formable sheet, the wood veneer layer, the thermosetting binder, and the substrate, thereby forming a building element comprising the substrate and the wood veneer layer attached to the substrate by the thermosetting binder, after applying heat and pressure, removing the formable sheet from the wood veneer layer.

An advantage of at least embodiments of the second aspect is that the natural embossing of the wood veneer layer is retained and sometimes even increased during pressing. Thereby, the wood veneer layer will have its natural embossing or even have a deeper embossing after pressing. When pressing in a conventional manner with a non-structured press plate, the wood veneer layer is compressed, and the natural structure of the wood veneer is reduced due to compressing of the wood veneer layer.

During pressing when pressure and heat is applied, formable properties of the formable sheet allow the formable sheet to follow the structure of the wood veneer layer and transfers the pressure from the pressing device to each part of the wood veneer layer. The formable sheet distributes the pressure applied substantially uniformly over the surface of the wood veneer layer. Thereby, a desirable substantially uniform pressure is applied to the wood veneer layer over its surface. The pressure applied to protruding parts of the wood veneer layer and naturally embossed portions of the wood veneer layer is substantially the same. In an embodiment the applied pressure between the protruding parts of the wood veneer surface and naturally embossed portions it within 10% of each other.

The formable sheet is pressed to follow the structure of the wooden surface. Pressure is applied into embossed portions of the wood veneer layer by the formable sheet.

Especially when a thermosetting binder is used to adhere the wood veneer layer to the substrate, distributing the pressure uniformly over the wood veneer layer surface is important to ensure that the thermosetting binder is cured at all parts. If the pressure is not uniformly distributed, there is a risk that the thermosetting binder is not completely cured at portions wherein the pressure applied is low.

If the substrate is provided with a groove, later intended to form e.g. a bevel, the formable sheet provides similar advantages as described above. The formable sheet allows the pressure to be distributed to the groove surface, with similar advantages as described above.

In the following, the term embossing or embossed portions is used to also include any groove.

A substantially uniformly distributed pressure is also of importance if a protective layer is applied on the wood veneer layer. Such a protective layer is applied intermediate the wood veneer layer and the formable sheet. A uniformly distributed pressure allows the protective layer to press into embossed portions of the wood veneer layer. Thereby, improved attachment of the protective layer to the wood veneer layer is obtained.

If the protective layer comprises a thermosetting binder, a uniform pressure distributed by the formable sheet improves uniform curing of the thermosetting binder. If the wood veneer layer comprises embossed portions, for example formed of a knot hole, crack and/or groove or bevel, there is a risk that the thermosetting binder is not completely cured at such portions. In the final product, this may be visible as such portions being hazy or white coloured. By improving distribution of the pressure applied by the formable sheet, uniform pressure is applied to such embossed portions and curing of the thermosetting binder is improved. Thereby, occurrence of portions being hazy or white coloured is a least reduced.

The press surface of the pressing device may be non-structured. The formable sheet allows the natural embossed structure to be retained.

The press surface of the pressing device may be substantially planar.

The formable material is a polymeric material such as a thermoplastic material. The thermoplastic material may be polyvinyl chloride (PVC). The thermoplastic material may be polypropylene (PP).

A thermoplastic material will provide the formable sheet with the desirable formable properties when pressure and heat is applied to the material. The formable sheet will then under heat and pressure be able to follow the structure of the wood veneer layer and transfers the pressure from the pressing device to each part of the wood veneer layer, as explained above.

An intermediate layer may be provided between a thermoplastic material and the wood veneer layer.

A thickness of the formable sheet may be less than 2 mm. The thickness of the formable sheet defines the maximum depth of an embossed portion of the wood veneer layer. However, the thicker sheet, heat transferring properties of the formable sheet may be reduced.

A thickness of the formable sheet may be between 0.2 to 1.5 mm, preferably between 0.4 to 1.2 mm.

During applying heat and pressure, the formable sheet may be pressed into a structure in the wood veneer layer. The formable sheet may follow a structure in the surface of the wood veneer layer.

The structure may be an embossing such as a natural embossing of the wood veneer, or a bevel or groove.

A depth of an embossed portion of the wood veneer layer after applying heat and pressure may exceed a depth of the embossed portion of the wood veneer layer prior to applying heat and pressure. The depth is measured at the same embossed portion. The formable sheet allows embossed portions to be further embossed by distributing the pressure substantially uniformly over the structured surface of the wood veneer layer and into the embossed portion. This surprising effect is especially noticeable if the wood veneer layer is of a type of wood having softer portions or portions of lower density, in relation to other types of wood, within the veneer layer. The deeper embossing may be achieved in such softer portions or portions of lower density during pressing. During pressing as the formable sheet is compressed increasing the hardness of the formable sheet. Simultaneously during pressing, the hardness of the wood veneer layer with its softer portions is decreased. When, during pressing, the hardness of the compressed formable sheet exceeds the hardness of such a softer portion in the wood veneer layer, the natural embossing in that portion may be increased.

The pressure applied from the pressing device may be uniformly applied to the wood veneer layer by means of the formable sheet.

The pressure applied may be 20-80 bar, preferably 40-60 bar.

The temperature applied may be 120-240° C., preferably 160-220° C.

Heat and pressure may be applied for 20-60 seconds, preferably for 30-45 seconds.

Heat and pressure applied may be adapted to the thermosetting binder used. Heat and pressure applied may be adapted to a curing temperature of the thermosetting binder.

The substrate may be a wood-based board. The building element may thereby be a building panel such as a floor panel, wall panel or furniture component.

The substrate may be a wood veneer layer. A building element may thereby be formed. The building element may in a subsequent step be applied to a board, for example a wood-based board, thereby forming a building panel such as a floor panel, wall panel or furniture component.

According to a third aspect, a pressing device for embossing a wooden surface such as a wood veneer layer, solid wood layer, or wood plank is provided. The pressing device comprises a press surface being non-structured, and an elastic sheet or a formable sheet comprising a polymeric material, wherein the elastic or formable sheet is positioned between the press surface and a wooden surface intended to be pressed such that the wooden surface is embossed by means of the elastic or formable sheet.

An advantage of at least embodiments of the third aspect is that the pressing device allows the natural embossing of the wooden surface to be increased. Thereby, the wooden surface will have a deeper embossing after pressing compared to prior to pressing. When pressing in a conventional manner with a non-structured press plate, the wooden surface is compressed and the natural structure of the wood veneer layer is reduced due to compressing of the wooden surface.

In the pressing device, elastic or formable properties of the elastic or formable sheet allow the elastic or formable sheet to follow the structure of the wooden surface and to transfer the pressure from the pressing device to each part of the wooden surface. The elastic or formable sheet distributes the pressure applied substantially uniformly over the surface of the wooden surface. Thereby, uniform pressure is applied to the wooden surface over its surface. The pressure applied to protruding parts of the wooden surface and embossed portions of the wooden surface is substantially the same.

The elastic or formable sheet is pressed to follow the structure of the wooden surface. Pressure is applied into embossed portions by the elastic or formable sheet.

An elastic sheet preferably has properties enabling it to spring back to its original form after pressing. This is advantageous since the elastic sheet then may be reused.

The wood veneer layer may be embossed by means of the elastic or formable sheet.

The press surface may be adapted to be heated to a temperature of 120-240° C., preferably 160-220° C.

The press surface may be adapted to apply a pressure of 20-80 bar, preferably 40-60 bar.

An elastic sheet may comprise an elastomeric material having a shore value of less than 60 D. It has been shown that a shore value less than 60 D is sufficient elastic to distribute the applied pressure uniformly over and into the structure of the wood veneer layer. The shore value is measured according to ISO 868:2003.

An elastic sheet may comprise an elastomeric material having a shore value in the range of 30 A to 60 D. It has been shown that a shore value between 30 A to 60 D provides desired elastic properties to distribute the applied pressure uniformly over and into the structure of the wood veneer layer. The shore value is measured according to ISO 868:2003.

If measuring the shore value in the A scale only, the elastic sheet may have a shore value in the range of 30 A to 98 A. The shore value is measured according to ISO 868:2003.

The polymeric material of an elastic sheet may be an elastomeric material. The elastomeric material may be natural or synthetic rubber.

The elastomeric material may be silicone rubber. The elastomeric material may be styrene-butadiene rubber. The elastomeric material may be fluoroelastomer.

The elastomeric material may be selected from synthetic polyisoprene, chloroprene rubber, butyl rubber, styrene-butadiene rubber (SBR), nitrile rubber, ethylene propylene rubber, polyacrylic rubber, silicone rubber, fluorosilicone rubber, fluoroelastomers, ethylene-vinyl acetate (EVA), elastomeric polyurethane. The elastomeric material may be a rubber blend such as EVA/SBR.

For example, a suitable shore value, as measured according to ISO 868:2003, of chloroprene rubber may be 40-95 A. A suitable shore value, as measured according to ISO 868:2003, of styrene-butadiene rubber (SBR), may be 60-70 A. A suitable shore value, as measured according to ISO 868:2003, of ethylene-vinyl acetate (EVA), may be 30-40 A.

The polymeric material of a formable sheet may be a thermoplastic material. The thermoplastic material may be polyvinyl chloride (PVC). The thermoplastic material may be polypropylene (PP).

An intermediate layer may be provided between a thermoplastic material and the wooden surface.

A thickness of the elastic or formable sheet may be less than 2 mm. The thickness of the elastic or formable sheet defines the maximum depth of an embossed portion of the wood veneer layer. However, the thicker sheet, heat transferring properties of the elastic or formable sheet may be reduced.

A thickness of the elastic or formable sheet may be between 0.2 to 1.5 mm, preferably between 0.4 to 1.2 mm.

After applying heat and pressure, a depth of an embossed portion of the wooden surface may be exceeding a depth of the embossed portion prior to applying heat and pressure. The same embossed portion is measured prior and after pressing.

According to a fourth aspect, a method of embossing a wooden surface such as a wood veneer layer, solid wood layer, or wood plank is provided. The method comprises applying an elastic sheet or a formable sheet comprising a polymeric material between a wooden surface and a press surface of a pressing device, wherein the press surface is non-structured, applying heat and pressure by the pressing device to the elastic or formable sheet and the wooden surface such that the wooden surface is embossed by the elastic or formable sheet.

An advantage of at least embodiments of the fourth aspect is that the natural embossing of the wooden surface is increased during pressing. Thereby, the wooden surface will have a deeper embossing after pressing. When pressing in a conventional manner with a non-structured press plate, the wooden surface is compressed and the natural structure of the wood veneer layer is reduced due to compressing of the wooden surface.

During pressing, elastic or formable properties of the elastic or formable sheet allow the elastic or formable sheet to follow the structure of the wooden surface and transfers the pressure from the pressing device to each part of the wooden surface. The elastic or formable sheet distributes the pressure applied substantially uniformly over the surface of the wooden surface. Thereby, uniform pressure is applied to the wooden surface over its surface. The pressure applied to protruding parts of the wooden surface and embossed portions of the wooden surface is substantially the same.

The elastic or formable sheet is pressed to follow the structure of the wooden surface. Pressure is applied into embossed portions by the elastic or formable sheet.

An elastic sheet preferably has properties enabling it to spring back to its original form after pressing. This is advantageous since the elastic sheet then may be reused.

After applying heat and pressure, a depth of an embossed portion of the wooden surface may be exceeding a depth of the embossed portion prior to applying heat and pressure. The same embossed portion is measured prior and after pressing.

The temperature applied may be 120-240° C., preferably 160-220° C.

The pressure applied may be 20-80 bar, preferably 40-60 bar.

An elastic sheet may comprise an elastomeric material having a shore value of less than 60 D. It has been shown that a shore value of less than 60 D is sufficient elastic to distribute the applied pressure uniformly over and into the structure of the wood veneer layer. The shore value is measured according to ISO 868: 2003.

An elastic sheet may comprise an elastomeric material having a shore value in the range of 30 A to 60 D. It has been shown that a shore value between 30 A to 60 D provides desired elastic properties to distribute the applied pressure uniformly over and into the structure of the wooden surface. The shore value is measured according to ISO 868: 2003.

If measuring the shore value in the A scale only, the elastic sheet may have a shore value in the range of 30 A to 98 A. The shore value is measured according to ISO 868:2003.

The polymeric material of an elastic sheet may bean elastomeric material. The elastomeric material may be natural or synthetic rubber.

The elastomeric material may be silicone rubber. The elastomeric material may be styrene-butadiene rubber. The elastomeric material may be fluoroelastomer.

The elastomeric material may be selected from synthetic polyisoprene, chloroprene rubber, butyl rubber, styrene-butadiene rubber (SBR), nitrile rubber, ethylene propylene rubber, polyacrylic rubber, silicone rubber, fluorosilicone rubber, fluoroelastomers, ethylene-vinyl acetate (EVA), elastomeric polyurethane. The elastomeric material may be a rubber blend such as EVA/SBR.

For example, a suitable shore value, as measured according to ISO 868:2003, of chloroprene rubber may be 40-95 A. A suitable shore value, as measured according to ISO 868:2003, of styrene-butadiene rubber (SBR), may be 60-70 A. A suitable shore value, as measured according to ISO 868:2003, of ethylene-vinyl acetate (EVA), may be 30-40 A.

The polymeric material of a formable sheet may be a thermoplastic material. The thermoplastic material may be polyvinyl chloride (PVC). The thermoplastic material may be polypropylene (PP).

An intermediate layer may be provided between a thermoplastic material and the wooden surface.

A thickness of the elastic or formable sheet may be less than 2 mm. The thickness of the elastic or formable sheet defines the maximum depth of an embossed portion of the wood veneer layer. However, the thicker sheet, heat transferring properties of the elastic or formable sheet may be reduced.

A thickness of the elastic or formable sheet may be between 0.2 to 1.5 mm, preferably between 0.4 to 1.2 mm.

BRIEF DESCRIPTION OF THE DRAWINGS

The present invention will by way of example be described in more detail with reference to the appended schematic drawings, which show embodiments of the present invention.

DETAILED DESCRIPTION

Figure 1:
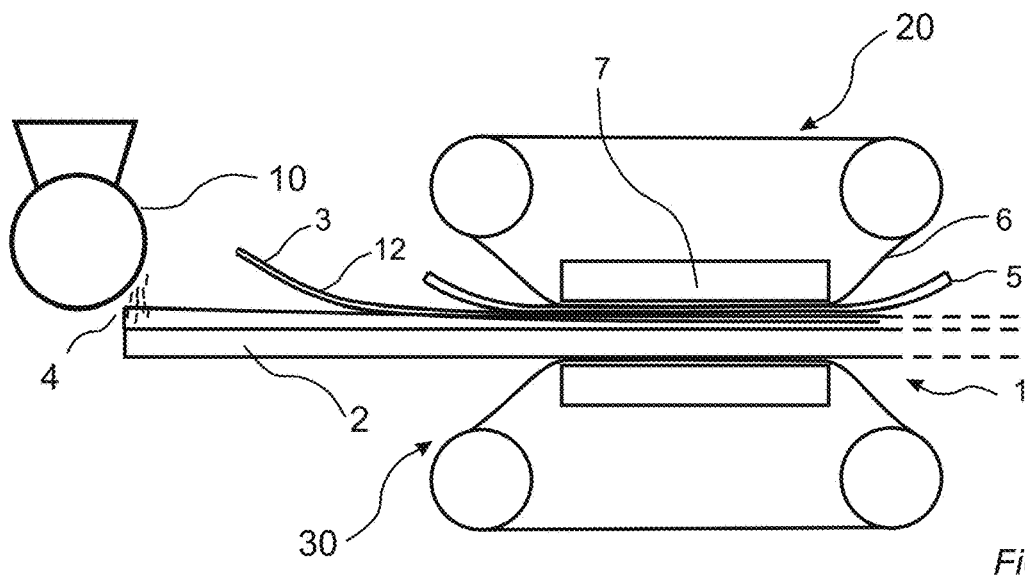
FIG. 1 shows a pressing device and a method of producing a building element.

FIG. 1 discloses a pressing device 20 and a method of producing a building element 1. In FIG. 1, a substrate 2 is provided. In one embodiment, the substrate 2 may be a wood veneer layer. In another embodiment, the substrate 2 may be a board such as a wood-based board, for example MDF, HDF, particle board, plywood, lamella core, etc. The board may be a thermoplastic board. The board may be a mineral board. The board may be a fibre cement board. The board may be magnesium oxide board.

In FIG. 1, a thermosetting binder 4 is applied on a surface of the substrate 2. The thermosetting binder 4 is adapted to adhere a wood veneer layer 3 to the surface of the substrate 2. As an alternative to applying the thermosetting binder 4 on the substrate, the thermosetting binder 4 may be applied on the wood veneer layer 3. The wood veneer layer 3 is arranged on the substrate 2 such the thermosetting binder 4 is intermediate the substrate 2 and the wood veneer layer 3.

The thermosetting binder 4 may be an amino resin such as melamine formaldehyde, urea formaldehyde or a combination thereof. The thermosetting binder 4 may be phenol formaldehyde. The thermosetting binder may be a co-polymer of vinyl acetate-ethylene (VAE) such as Vinnapas®.

The thermosetting binder 4 may be applied in powder form, as a paste or in liquid form. If the thermosetting binder 4 is applied in liquid form, the thermosetting binder 4 may be dried before pressing (not shown). The thermosetting binder 4 may be provided in form of a sheet, for example, as a sheet impregnated with the thermosetting binder.

In the embodiment shown in FIG. 1, the thermosetting binder 4 is applied in powder form on the substrate 2. The thermosetting binder 4 is applied by a scattering device 10.

In addition to the thermosetting binder 4, other material may be applied to the surface of the substrate 2 or to the wood veneer layer 3. Wood particles such as cellulosic or lignocellulosic particles may be applied. Other types of fillers may be included. Pigments may be included. Wear resistant particles and/or scratch resistant particles such as aluminium oxide or silica may be included. Additives, for example having sound absorbing properties, heat conducting properties, anti-static agents, blowing agents, etc. may be included. Such material, together with the thermosetting binder, may form a sub-layer arranged between the substrate 2 and the wood veneer layer 3.

The wood veneer layer 3 has a wooden surface 12.

The wood veneer layer 3 may have a thickness of less than 2.5 mm, such as having a thickness of about 0.2-1.2 mm. The wood veneer layer 3 may be selected from oak, maple, birch, walnut, ash, pine. The wood veneer layer 3 is arranged such that the thermosetting binder 4 is intermediate the wood veneer layer 3 and the substrate 2. The wood veneer layer may be rotary cut or sawn.

A protective layer (not shown) may be arranged on the wooden surface 12 of the wood veneer layer 3 facing away from the substrate 2 prior to pressing. The protective layer may be a sheet impregnated with a thermosetting binder. The protective layer may be formed by a thermosetting binder applied on the wood veneer layer 3 in powder form, in liquid form, or as a paste.

The substrate 2 with the thermosetting binder 4 and the wood veneer layer 3 arranged thereon, and optionally the protective layer, is conveyed to a pressing device 20. The pressing device 20 may be a static on continuous press. In FIGS. 1-4, a continuous press is shown.

The pressing device 20 comprises a press plate. The press plate has a press surface 21. The press surface 21 is preferably non-structured. The press surface 21 may be substantially planar.

The press plate may be in form of a press belt 6 if the pressing device 20 is a continuous press.

In FIGS. 1-4, the press plate of the pressing device 20 is in form of a press belt 6 having a press surface 21. The press belt 6 is continuous. The press belt 6 is preferably non-structured. Thereby, the press surface 21 is preferably non-structured. The press surface 21 may be substantially plane.

Pressure may be applied by a press table 7.

An elastic sheet or a formable sheet 5 is arranged between the wood veneer layer 3 and the press surface 21. If a protective layer is provided, the elastic or formable sheet 5 is arranged between the wood veneer layer 3 with the protective layer and the press plate 6.

The elastic or formable sheet 5 may be provided as a separate sheet, as shown in the FIGS. 1-4, or be provided from a first roll to a second roll (roll-to-roll). Alternatively, the press belt 6 may be coated with the elastic or formable sheet 5.

The elastic or formable sheet 5 may be made of a polymeric material.

In an embodiment, the polymeric material may be a thermoplastic material making the sheet 5 a formable sheet which gets its formable properties when heat and pressure is applied during pressing with the pressing device 20. The thermoplastic material may be one or more of polyvinyl chloride (PVC), polypropylene (PP), polyurethane (TPU).

If a thermoplastic material is used that melts, or partially melts, during pressing, an intermediate sheet (not shown) may be arranged between the wood veneer layer 3 and the formable sheet 5. The intermediate sheet is formable and do not stick to the wood veneer layer after pressing. Such an intermediate sheet may be an aluminium foil.

After pressing, the pressing device 20, the formable sheet 5 and the intermediate sheet is removed from the wood veneer layer.

It may be preferred to have an intermediate sheet if the formable layer comprises a thermoplastic material and if the pressing temperature is above 100° C.

In an embodiment, the polymeric material of the elastic sheet 5 may be an elastomer. The elastomer may be natural or synthetic rubber. The elastomeric material may be silicone rubber. The elastomeric material may be styrene-butadiene rubber.

The thickness of the elastic or formable sheet 5 may be less than 2 mm, preferably between 0.2 to 1.5 mm such that between 0.4 to 1.2 mm.

If the elastic or formable sheet 5 is foamed, the thickness of a foamed elastic or formable sheet may be exceeding 2 mm, such as having a thickness in the range of 2-4 mm.

The width of the elastic or formable sheet 5 may correspond to the width of the wood veneer layer 3 to be pressed.

The thickness T of the elastic or formable sheet 5 may define the maximum depth t of an embossed portion of the wood veneer layer 3 after pressing.

The elastic sheet 5, comprising an elastomer, has elastic properties such that the elastic sheet 5 can be compressed and spring back.

Preferably, the shore value of the elastic sheet 5 is less than 60 D. The shore value of the elastic sheet 5 may be between 30 A to 60 D.

The pressure applied by the pressing device 20 to the wood veneer layer 3 may be 20-80 bar, preferably 40-60 bar.

The temperature applied by the press table 7 may be 120-240° C., preferably 160-220° C. The temperature may be higher at an upper press table 7 compared to a lower press table 7'.

The elastic or formable sheet 5 may absorb heat such that the temperature on applied on the wood veneer layer is about 15° C. lower than the temperature at the press table 7 itself.

Heat and pressure may be applied by the pressing device 20 during 20-60 seconds, preferably during 30-45 seconds. In some embodiments, heat and pressure may be applied during 60-120 seconds.

During pressing, the elastic or formable sheet 5 may increase the natural embossing or structure of the wood veneer layer 3, which is further described with reference to FIG. 3 below.

During pressing, the wood veneer layer 3 is adhered to the substrate 2 by the thermosetting binder 4. The thermosetting binder 4 is cured during pressing.

The thermosetting binder 4 may permeate through the wood veneer layer 3 during pressing. The thermosetting binder 4, with optionally fillers and additives, may at least partly fill holes, cracks, and/or knots during pressing.

In an embodiment wherein a protective layer (not shown) comprising a thermosetting binder is arranged above the wood veneer layer 3, the thermosetting binder of the protective layer is cured during pressing.

Any protective layer (not shown) is pressed into the structure of the wood veneer layer, such as the protective layer follows the structure of the wood veneer layer 3 after pressing.

After pressing, a building element 1 is provided. If the substrate 2 is a board such as a wood-based board, the building element 1 may be a building panel. If the substrate 2 is a wood veneer layer, the building element 1 may in a later step be adhered, for example by an adhesive, to a board such as a wood-based board, thereby forming a building panel.

The pressing operation and behaviour of the elastic or formable sheet 5 during pressing will be described in more detail with reference to FIG. 3 below.

Figure 2:
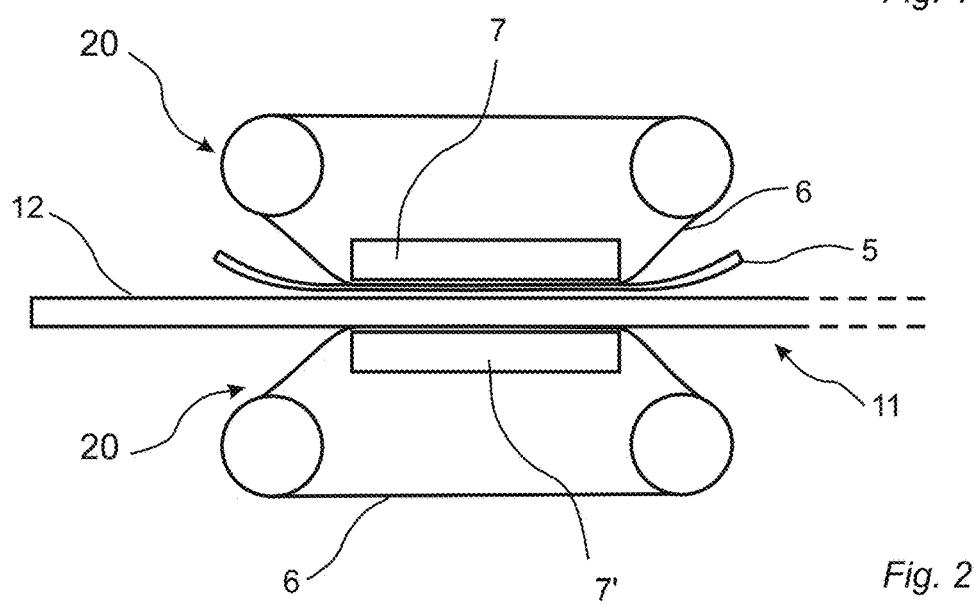
FIG. 2 shows the pressing device and a method of embossing a wooden surface.

FIG. 2 discloses a pressing device 20 and a method of embossing a wooden surface 12. In FIG. 2, a wood element 11 such as a wood plank, solid wood layer, or wood veneer layer, having a wooden surface 12 is provided.

The wood element 11 may be a wood veneer layer. The wood veneer layer may have a thickness of less than 2.5 mm, such as a thickness of about 0.2-1.2 mm. The wood veneer layer may be selected from oak, maple, birch, walnut, ash, pine.

The wood element 11 may be a solid wood layer. The solid wood layer may have a thickness exceeding 2.5 mm, such as 2.5-10 mm. The solid wood layer may be of the type used for the surface of parquet flooring. The solid wood layer may be selected from oak, maple, birch, walnut, ash, pine.

The wood element 11 may be a wood plank. The wood plank may have a thickness exceeding the thickness of a solid wood layer, such as having a thickness of 10-50 mm. The wood plank may be selected from oak, maple, birch, walnut, ash, pine.

The wood element 11 is conveyed to a pressing device 20. The pressing device 20 may be a static on continuous press. In FIG. 2, a continuous press is shown.

The pressing device 20 comprises a press plate. The press plate has a press surface 21. The press surface 21 is preferably non-structured. The press surface 21 may be substantially plane.

The press plate may be in form of a press belt 6 if the pressing device 20 is a continuous press.

In FIG. 2, the press plate of the pressing device 20 is in form of a press belt 6 having a press surface 21. The press belt 6 is continuous. The press belt 6 is preferably non-structured. Thereby, the press surface 21 is preferably non-structured. The press surface 21 may be substantially plane.

Pressure may be applied by a press table 7.

An elastic or formable sheet 5 is arranged between the wooden surface 12 of the wood element 11 and the press plate 6. If a protective layer is provided, the elastic or formable sheet 5 is arranged between the wooden surface 12 of the wood element 11 with the protective layer applied thereto and the press plate 6.

The elastic or formable sheet 5 may be made/formed a polymeric material.

In an embodiment, the polymeric material may a thermoplastic material, making the sheet 5 a formable sheet 5 which gets its formable properties when heat and pressure is applied during pressing with the pressing device 20. The thermoplastic material may be one or more of polyvinyl chloride (PVC), polypropylene (PP), polyurethane (TPU).

If a thermoplastic material is used that melts, or partially melts, during pressing, an intermediate sheet (not shown) may be arranged between the wooden surface 12 and the formable sheet 5.

The intermediate sheet is formable and do not stick to the wood veneer layer after pressing. Such an intermediate sheet may be an aluminium foil.

After pressing, the pressing device 20, the formable sheet 5 and the intermediate sheet is removed from the wood veneer layer.

It may be preferred to have an intermediate sheet if the formable layer comprises a thermoplastic material and if the pressing temperature is above 100° C.

In an embodiment, the polymeric material of the elastic sheet 5 may be an elastomer. The elastomer may be natural or synthetic rubber. The elastomeric material may be silicone rubber. The elastomeric material may be styrene-butadiene rubber.

The thickness of the elastic or formable sheet 5 may be less than 2 mm, preferably between 0.2 to 1.5 mm such that between 0.4 to 1.2 mm.

If the elastic or formable sheet 5 is foamed, the thickness of a foamed elastic sheet may be exceeding 2 mm, such as having a thickness in the range of 2-4 mm.

The width of the elastic or formable sheet 5 may correspond to the width of the wood element 11 to be pressed.

The thickness T of the elastic or formable sheet 5 may define the maximum depth t of an embossed portion of the wood surface 12 after pressing.

The elastic sheet 5, comprising an elastomer, has elastic properties such that the elastic sheet 5 can be compressed and spring back.

Preferably, the shore value of the elastic sheet 5 is less than 60 D. The shore value of the elastic sheet 5 may be between 30 A to 60 D.

The pressure applied by the pressing device 20 to the wooden element 12 may be 20-80 bar, preferably 40-60 bar.

The temperature applied by the pressing device 20 may be 120-240° C., preferably 160-220° C. The temperature may be higher at an upper press table 7 compared to a lower press table 7'.

Heat and pressure may be applied by the pressing device 20 during 20-60 seconds, preferably during 30-45 seconds.

During pressing, the elastic or formable sheet 5 may increase the natural embossing or structure of the wooden element 11, which will be described below in more details with reference to FIG. 3.

After pressing, a depth t of an naturally embossed portion is larger than a depth of the same naturally embossed portion prior to pressing.

After pressing, an embossed wooden surface 12 of the wood element 11 is provided. The wood element 11 may be adhered, for example by an adhesive, to a board such as a wood-based board, thereby forming a building panel, for example a floor panel, wall panel or furniture component.

Figure 3:
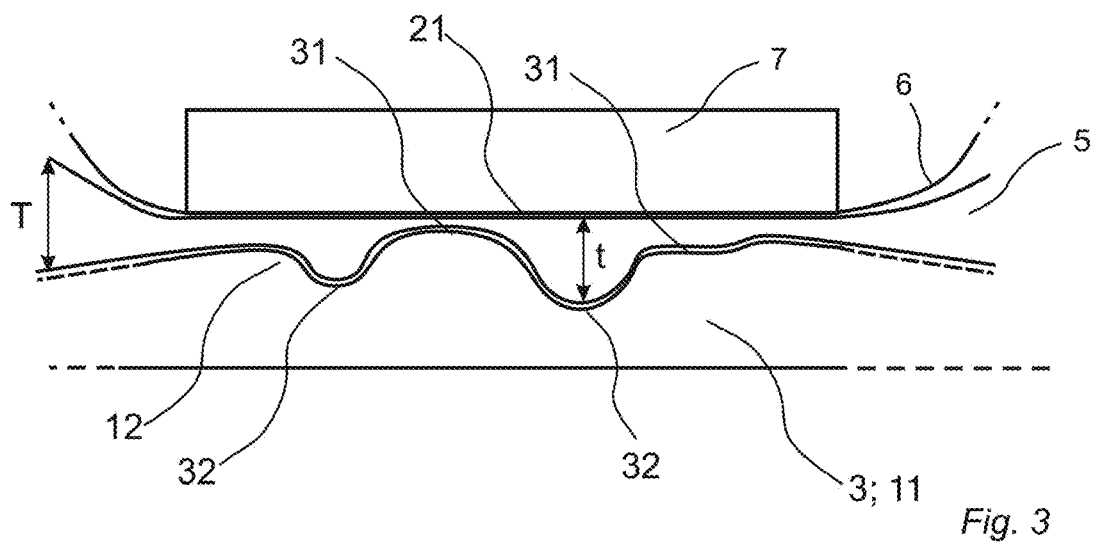
FIG. 3 shows pressing and the pressing device in more details.

FIG. 3 discloses a portion of the pressing device 20, shown in FIGS. 1 and 2, and a portion of the wood veneer layer 3 as described above with reference to FIG. 1 or a portion of a wooden element 11 as described above with reference to FIG. 2. Common for both the wood veneer layer 3 and the wood element 11 is that both have a wooden surface 12.

FIG. 3 discloses how the elastic or formable sheet 5 may behave during pressing. The elastic or formable properties of the elastic or formable sheet 5 allow the elastic or formable sheet 5 to be compressed above a protruding portion 31 of the wood veneer layer 3 or the wood element 11. The elastic or formable properties of the elastic or formable sheet 5 allow the elastic or formable sheet 5 to be pressed into a lower portion, i.e. an embossed portion 32 of the wood veneer layer 3 or wood element 11.

The structure of the wood veneer layer 3 or wood element 11 referred to above may be naturally occurring. During pressing, the structure of the wood veneer layer 3 or wood element 11 may be increased by naturally embossed portions being further embossed.

The increased embossing is obtained by the elastic or formable sheet 5 being pressed into and following the structure of the wood veneer layer 3 or wood element 11. Thereby, the pressure is applied and distributed to lower portions of the wood veneer layer 3 or wood element 11, forming embossed portions 32. The pressure may be applied substantially uniformly to both protruding portions 31 and embossed portions 32 due to the elastic or formable sheet 5. The elastic or formable sheet 5 provides an improved pressure distribution of the wooden surface 12 of the wood veneer layer 3 or wood element 11.

By pressing with the elastic or formable sheet 5, a depth t of an embossed portion 32 may be larger after pressing compared to the depth of the embossed portion 32 prior to pressing.

This surprising effect is especially noticeable if the wood veneer layer is of a type of wood having softer portions or portions of lower density, in relation to other types of wood, within the veneer layer. The deeper embossing may be achieved in such softer portions or portions of lower density during pressing. During pressing as the elastic or formable sheet is compressed increasing the hardness of the elastic or formable sheet. Simultaneously during pressing, the hardness of the wood veneer layer with its softer portions is decreased. When, during pressing, the hardness of the compressed elastic or formable sheet exceeds the hardness of such a softer portion in the wood veneer layer, the natural embossing in that portion may be increased.

In known solutions, the pressure is mainly applied to upper portions 31 of the wood veneer layer 3 or wood element 11. Thereby, such portions are compressed. The pressure applied to lower portions such as embossed portion of a wood veneer layer 3 or wood element 11 is lower, and such portions are not compressed. As a consequence, the structure of the wood veneer layer 3 or wood element 11 is made more even or flat as compared to prior to pressing.

Further, if a protective layer (not shown) is applied above the wood veneer layer 3 or wood element 11, the elastic or formable sheet 5 allows the protective layer to be pressed into and to follow the structure of the wood veneer layer 3 or wood element 11. The elastic or formable sheet 5 allows the protective layer to be pressed into a lower portion such as an embossing 32 of the wood veneer layer 3 or wood element 11.

If a thermosetting binder is applied on the wood veneer layer 3 or wood element 11, for example in form of a protective layer or forming a protective layer after pressing, the elastic or formable sheet 5 provides for curing of the thermosetting binder even at embossed portions 32 of the wood veneer layer 3 or wood element 11. The elastic or formable sheet 5 transfers the pressure and temperature to embossed portions 32 of the wood veneer layer 3 or wood element 11 such that the thermosetting binder can be cured.

The thickness T of the elastic or formable sheet 5 may define the maximum depth t of the embossed portion 32 of the wood veneer layer 3 or wood element 11. The thickness T of the elastic or formable sheet 5 defines the maximum depth to which pressure from the pressing table 7 can be transferred to the wood veneer layer 3 or wood element 11 by the elastic or formable sheet 5.

Figure 4:
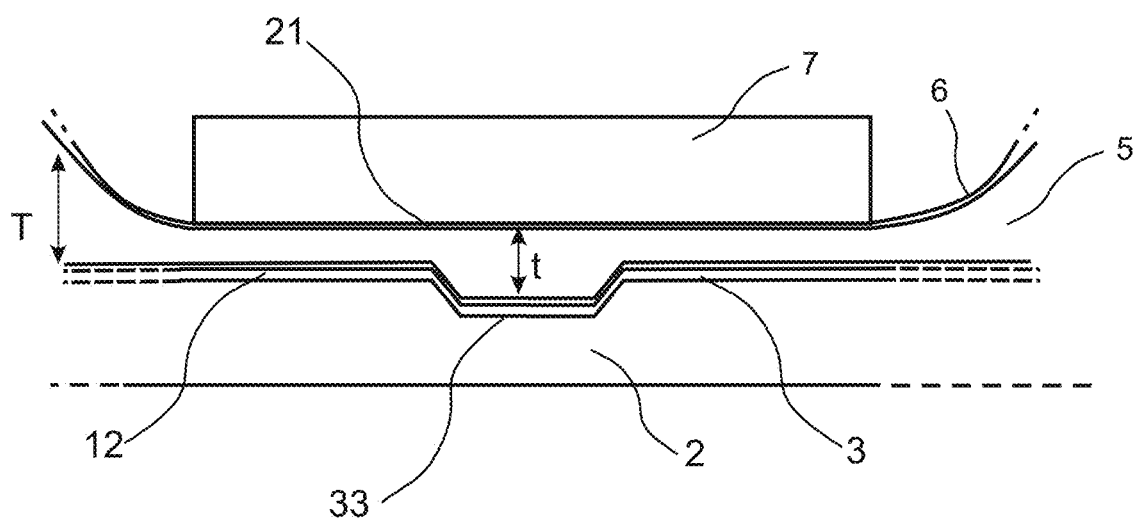
FIG. 4 shows pressing of a groove.

FIG. 4 discloses an embodiment wherein the embossed portion is a groove. In FIG. 4, a portion of the pressing device 20, shown in FIGS. 1 and 2, and a portion of the wood veneer layer 3 as described above with reference to FIG. 1 or wooden element 11 as described above with reference to FIG. 2, is shown. Common for both the wood veneer layer 3 and the wood element 11 is that both have a wooden surface 12.

In FIG. 4, a groove 33 is formed in the substrate 2, for example a wood-based board, as described above with reference to FIG. 1. The groove 33 is formed by removing a portion of an upper surface of the substrate 2. After pressing, the building panel 1 thereby formed may be cut at the region of the groove 33, creating two bevels facing each other. A mechanical locking system may be formed at the edge of the building panel 1, below the groove or bevel 33.

A thermosetting binder of the type described above with reference to FIG. 1 may be applied between the wood veneer layer 3 and the substrate 2.

FIG. 4 discloses how the elastic or formable sheet 5 behaves during pressing at a groove 33 provided in the substrate 2. The elastic or formable properties of the elastic or formable sheet 5 allow the elastic or formable sheet 5 to be compressed above an upper portion of the wood veneer layer 3. The elastic or formable properties of the elastic or formable sheet 5 allow the elastic or formable sheet 5 to be pressed into a lower portion such as the groove 33 of the wood veneer layer 3. Thereby, the wood veneer layer 3 is pressed to follow the groove 33 provided at the surface of the substrate 2.

During pressing, the elastic or formable sheet 5 is pressed into and following the structure of the wood veneer layer 3. Thereby, the pressure is applied and distributed to lower portions of the wood veneer layer 3, forming a groove 33. The pressure may be applied substantially uniformly to both an upper surface of the wooden surface 12 and to grooves 33 due to the elastic or formable sheet 5.

The improved distribution of the pressure improves curing of the thermosetting binder arranged between the wood veneer layer 3 and the substrate 2 at the groove 33. The elastic or formable sheet 5 transfers the pressure and temperature to the groove 33 such that the thermosetting binder can be cured. Thereby, attachment of the wood veneer layer 3 to the substrate 2 is improved.

Further, if a protective layer (not shown) is applied above the wood veneer layer 3, the elastic or formable sheet 5 allows the protective layer to be pressed into and to follow the structure of the wood veneer layer 3 at the groove 33. The elastic sheet or formable 5 allows the protective layer to be pressed into a lower portion such as a groove 33 of the wood veneer layer 3.

If a thermosetting binder is applied on the wood veneer layer 3, for example in form of a protective layer or forming a protective layer after pressing, the elastic or formable sheet 5 provides for curing the thermosetting binder even at a groove 33 of the wood veneer layer 3. The elastic or formable sheet 5 transfers the pressure and temperature to the groove 33 of the wood veneer layer 3 such that the thermosetting binder can be cured.

The thickness T of the elastic or formable sheet 5 may define the maximum depth t of the groove 33. The thickness T of the elastic or formable sheet 5 defines the maximum depth to which pressure from the pressing table 7 can be transferred to the wood veneer layer 3.

It is contemplated that there are numerous modifications of the embodiments described herein, which are still within the scope of the invention as defined by the appended claims.

EXAMPLES

Reference Example 1

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m2. A wood veneer layer having a thickness of 0.6 mm was applied on the sub-layer. The assembly was arranged in a short cycle lamination hot press. The temperature of the upper press table was 195° C. and the temperature of the lower press table was 180° C. The pressure applied was 40 bar. The pressing time was 45 seconds.

During the pressing, the natural embossing of the wood is flattened out. After pressing, the depth of the embossings was measured to 0-0.1 mm.

Example 1

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m$^2$. A wood veneer layer having a thickness of 0.6 mm was applied on the sub-layer. The assembly was arranged in a short cycle lamination hot press. An elastic sheet in form of a silicone rubber sheet having a thickness of 0.5 mm and a shore value of 40 A as measured according to ISO 868: 2003 was arranged in the press between the wood veneer and the press belt. The temperature of the upper press table was 195° C. and the temperature of the lower press table was 180° C. The pressure applied was 40 bar. The pressing time was 45 seconds.

During the pressing, the elastic sheet is pressed into the natural embossed structure of the wood veneer layer and increases the depth of the embossed structure. After pressing, the depths of the natural embossings were measured to 0.2-0.4 mm.

Example 2

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m$^2$. A wood veneer layer having a thickness of 0.6 mm was applied on the sub-layer. The assembly was arranged in a short cycle lamination hot press. An elastic sheet in form of a silicone rubber sheet having a thickness of 0.5 mm and a shore value of 60 A as measured according to ISO 868: 2003 was arranged in the press between the wood veneer and the press belt. The temperature of the upper press table was 195° C. and the temperature of the lower press table was 180° C. The pressure applied was 40 bar. The pressing time was 45 seconds.

During the pressing, the elastic sheet is pressed into the natural embossed structure of the wood veneer layer and increases the depth of the embossed structure. After pressing, the depths of the natural embossings were measured to 0.2-0.4 mm.

Example 3

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m$^2$. A wood veneer layer having a thickness of 0.6 mm was applied on the sub-layer. The assembly was arranged in a short cycle lamination hot press. An elastic sheet in form of a silicone rubber sheet having a thickness of 1.0 mm and a shore value of 60 A as measured according to ISO 868: 2003 was arranged between the press between the wood veneer and the press belt. The temperature of the upper press table was 195° C. and the temperature of the lower press table was 180° C. The pressure applied was 50 bar. The pressing time was 55 seconds.

During the pressing, the elastic sheet is pressed into the natural embossed structure of the wood veneer layer and increases the depth of the embossed structure. After pressing, the depths of the natural embossings were measured to 0.3-0.6 mm.

Example 4

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m$^2$. A wood veneer layer having a thickness of 0.6 mm was applied on the sub-layer. An overlay in form of a paper overlay (AC3 HS) was arranged on the wood veneer layer. The assembly was arranged in a short cycle lamination hot press. An elastic sheet in form of a silicone rubber sheet having a thickness of 0.5 mm and a shore value of 40 A as measured according to ISO 868: 2003 was arranged in the press between the paper overlay and the press belt. The temperature of the upper press table was 195° C. and the temperature of the lower press table was 180° C. The pressure applied was 50 bar. The pressing time was 55 seconds.

During the pressing, the elastic sheet is pressed into the natural embossed structure of the wood veneer layer and increases the depth of the embossed structure. After pressing, depths of the natural embossings were measured to 0.2-0.4 mm.

Example 5

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m$^2$. A wood veneer layer having a thickness of 0.6 mm is applied on the sub-layer. An overlay in form of a paper overlay (AC3 HS) was arranged on the wood veneer layer. The assembly was arranged in a short cycle lamination hot press. An elastic sheet in form of a silicone rubber sheet having a thickness of 0.5 mm and a shore value of 60 A as measured according to ISO 868: 2003 was arranged in the press between the paper overlay and the press belt. The temperature of the upper press table was 195° C. and the temperature of the lower press table was 180° C. The pressure applied was 50 bar. The pressing time was 55 seconds.

During the pressing, the elastic sheet is pressed into the natural embossed structure of the wood veneer layer and increases the depth of the embossed structure. After pressing, depths of the embossings were measured to 0.2-0.4 mm.

Example 6

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m$^2$. A wood veneer layer having a thickness of 0.6 mm was applied on the sub-layer. The assembly was arranged in a short cycle lamination hot press. An elastic sheet comprising fluroelastomers (Viton®) sheet having a thickness of 0.5 mm and a shore value of 75 A as measured according to ISO 868:

2003 was arranged in the press between the wood veneer and the press belt. The temperature of the upper press table was 195° C. and the temperature of the lower press table was 180° C. The pressure applied was 40 bar. The pressing time was 45 seconds.

During the pressing, the elastic sheet is pressed into the natural embossed structure of the wood veneer layer and increases the depth of the embossed structure.

Example 7

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m². A wood veneer layer having a thickness of 0.6 mm is applied on the sub-layer. An overlay in form of a paper overlay (AC3 HS) was arranged on the wood veneer layer. The assembly was arranged in a short cycle lamination hot press. An elastic sheet comprising fluroelastomers (Viton®) sheet having a thickness of 0.5 mm and a shore value of 75 A as measured according to ISO 868: 2003 was arranged in the press between the paper overlay and the press belt. The temperature of the upper press table was 195° C. and the temperature of the lower press table was 165° C. The pressure applied was 50 bar. The pressing time was 55 seconds.

During the pressing, the elastic sheet is pressed into the natural embossed structure of the wood veneer layer and increases the depth of the embossed structure.

Example 8

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The mix was applied in an amount of 450-500 g/m². A wood veneer layer having a thickness of 0.6 mm was applied on the sub-layer. The assembly was arranged in a short cycle lamination hot press. A formable sheet comprising polytetrafluroethylene (PFTE) having a thickness of 0.5 mm was arranged in the press between the wood veneer and the press belt. The temperature of the upper press table was 195° C. and the temperature of the lower press table was 180° C. The pressure applied was 50 bar. The pressing time was 45 seconds.

During the pressing, the formable sheet is pressed into the natural embossed structure of the wood veneer layer and increases the depth of the embossed structure.

Example 9

A solid wood layer having a thickness of 3.7 mm was arranged in a short cycle lamination hot press. An elastic sheet in form of a silicone rubber sheet having a thickness of 0.5 mm and a shore value of 60 A as measured according to ISO 868: 2003 was arranged in the press between the solid wood layer and the press belt. The temperature of the upper press table was 195° C. and the temperature of the lower press table was 170° C. The pressure applied was 50 bar. The pressing time was 45 seconds.

During the pressing, the elastic sheet is pressed into the natural embossed structure of the solid wood layer and increases the depth of the embossed structure. After pressing, the depths of the embossings were measured to 0.2-0.4 mm.

Example 10

A solid wood layer having a thickness of 3.7 mm was arranged in a short cycle lamination hot press. An elastic sheet in form of a silicone rubber sheet having a thickness of 0.5 mm and a shore value of 60 A as measured according to ISO 868: 2003 was arranged in the press between the solid wood layer and the press belt. An overlay in form of a paper overlay (AC3 HS) was arranged on the solid wood layer. The temperature of the upper press table was 195° C. and the temperature of the lower press table was 170° C. The pressure applied was 50 bar. The pressing time was 45 seconds.

During the pressing, the elastic sheet is pressed into the natural embossed structure of the solid wood layer and increases the depth of the embossed structure. After pressing, the depths of the embossings were measured to 0.2-0.4 mm.

Reference Example 2

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The HDF board was provided with a groove having a depth of 1 mm. The mix was applied in an amount of 450-500 g/m2. A wood veneer layer having a thickness of 0.6 mm was applied on the sub-layer. The assembly was arranged in a short cycle lamination hot press. The temperature of the upper press table was 195° C. and the temperature of the lower press table was 180° C. The pressure applied was 50 bar. The pressing time was 45 seconds.

During the pressing, the wood veneer and powder in the part above the groove is not pressed into the groove enough to apply sufficient pressure. The result is that the sub-layer in the groove is insufficiently cured and the adhesion and aesthetics are poor.

Example 11

A sub-layer comprising a mix in dry form comprising wood fibres in an amount of 37.4 wt %, a binder in form of urea formaldehyde in an amount of 52.5 wt %, pigments and additives, was applied on an HDF board having a thickness of 10 mm. The HDF board was provided with a groove having a depth of 1 mm. The mix was applied in an amount of 450-500 g/m². A wood veneer layer having a thickness of 0.6 mm was applied on the sub-layer. The assembly was arranged in a short cycle lamination hot press. An elastic sheet in form of a silicone rubber sheet having a thickness of 1.0 mm and a shore value of 60 A as measured according to ISO 868: 2003 was arranged in the press between the wood veneer and the press belt. The temperature of the upper press table was 195° C. and the temperature of the lower press table was 180° C. The pressure applied was 50 bar. The pressing time was 45 seconds.

During the pressing, the elastic sheet follows the groove and applies pressure to the groove such that the sub-layer is cured.

The invention claimed is:
1. A method for producing a building element, comprising:

providing a substrate, applying a thermosetting binder on the substrate or on a wood veneer layer, arranging the wood veneer layer on the substrate with the thermosetting binder intermediate the substrate and the wood veneer layer, arranging an elastic sheet comprising a polymeric material between the wood veneer layer and a press surface of a pressing device, applying heat and pressure by the pressing device on the elastic sheet, the wood veneer layer, the thermosetting binder, and the substrate, thereby forming a building element comprising the substrate and the wood veneer layer attached to the substrate by the thermosetting binder, after applying the heat and pressure, removing the elastic sheet from the wood veneer layer.

2. The method according to claim 1, wherein the wood veneer layer is embossed by means of the elastic sheet.

3. The method according to claim 1, wherein the elastic sheet has a shore value of less than 60 D as measured according to ISO 868:2003.

4. The method according to claim 1, wherein the elastic sheet has a shore value in the range of 30 A to 60 D as measured according to ISO 868:2003.

5. The method according to claim 1, wherein the elastic sheet comprises an elastomeric material.

6. The method according to claim 1, wherein a thickness of the elastic sheet is less than 2 mm.

7. The method according to claim 1, wherein, during the applying of the heat and pressure, the elastic sheet is pressed into a structure in the wood veneer layer.

8. The method according to claim 1, wherein the press surface of the pressing device is non-structured.

9. The method according to claim 1, wherein a depth of an embossed portion of the wood veneer layer after the applying of the heat and pressure exceeds a depth of the embossed portion of the wood veneer layer prior to the applying of the heat and pressure.

10. The method according to claim 1, wherein the pressure applied by the pressing device is uniformly applied to the wood veneer layer by means of the elastic sheet.

11. The method according to claim 1, wherein the pressure applied is 20-80 bar.

12. The method according to claim 1, wherein the applying of the heat and pressure occurs at a temperature of 120-240 ° C.

13. The method according to claim 1, wherein the applying of the heat and pressure occurs for 20-60 seconds.

14. The method according to claim 1, wherein the substrate is a wood based board.

15. The method according to claim 1, wherein the substrate is a wood veneer layer.

16. A method for producing a building element, comprising:

providing a substrate, applying a thermosetting binder on the substrate or on a wood veneer layer, arranging the wood veneer layer on the substrate with the thermosetting binder intermediate the substrate and the wood veneer layer, arranging a formable sheet comprising a thermoplastic material between the wood veneer layer and a press surface of a pressing device, applying heat and pressure by the pressing device on the formable sheet, the wood veneer layer, the thermosetting binder, and the substrate, thereby forming a building element comprising the substrate and the wood veneer layer attached to the substrate by the thermosetting binder, after applying the heat and pressure, removing the formable sheet from the wood veneer layer.

17. The method according to claim 16, wherein the wood veneer layer is embossed by means of the formable sheet.

18. The method according to claim 16, wherein a thickness of the formable sheet is less than 2 mm.

19. The method according to claim 16, wherein, during the applying of the heat and pressure, the formable sheet is pressed into a structure in the wood veneer layer.

20. The method according to claim 16, wherein the press surface of the pressing device is non-structured.

21. The method according to claim 16, wherein a depth of an embossed portion of the wood veneer layer after the applying of the heat and pressure exceeds a depth of the embossed portion of the wood veneer layer prior to the applying of the heat and pressure.

22. The method according to claim 16, wherein the pressure applied by the pressing device is uniformly applied to the wood veneer layer by means of the formable sheet.

23. The method according to claim 16, wherein the pressure applied is 20-80 bar.

24. The method according to claim 16, wherein a temperature of 120-240 ° C. is applied during the applying of the heat and pressure.

25. The method according to claim 16, wherein the applying of the heat and pressure occurs at a temperature of 120-240 ° C.

26. The method according to claim 16, wherein the substrate is a wood-based board.

27. The method according to claim 16, wherein the substrate is a wood veneer layer.

28. The method according to claim 1, the elastic sheet comprising a polymeric material is arranged on the wood veneer layer, thereby placing the elastic sheet between the wood veneer layer and the press surface of the pressing device.

29. The method according to claim 16, the formable sheet comprising a polymeric material is arranged on the wood veneer layer, thereby placing the formable sheet between the wood veneer layer and the press surface of the pressing device.

30. The method according to claim 1, wherein the thermosetting binder is cured during the application of heat and pressure by the pressing device on the elastic sheet.

31. The method according to claim 16, wherein the thermosetting binder is cured during the application of heat and pressure by the pressing device on the formable sheet.

* * * * *